(12) United States Patent
Ishihara (10) Patent No.: US 9,398,218 B2
(45) Date of Patent: Jul. 19, 2016

(54) IMAGE CAPTURING APPARATUS (71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/758,209

(22) PCT Filed: Dec. 19, 2013

(86) PCT No.: PCT/JP2013/085294
§ 371 (c)(1),
(2) Date: Jun. 26, 2015

(87) PCT Pub. No.: WO2014/104379
PCT Pub. Date: Jul. 3, 2014

(65) Prior Publication Data
US 2015/0341560 A1    Nov. 26, 2015

(30) Foreign Application Priority Data

Dec. 28, 2012 (JP) ................................ 2012-286688

(51) Int. Cl.
*H04N 5/232* (2006.01)
*G06T 7/00* (2006.01)
(Continued)

(52) U.S. Cl.
CPC .............. *H04N 5/23248* (2013.01); *G01C 3/08* (2013.01); *G06T 7/0069* (2013.01); *G06T 7/0081* (2013.01); *G06T 7/2006* (2013.01); *G06T 7/408* (2013.01); *H04N 5/23212* (2013.01);
(Continued)

(58) Field of Classification Search
CPC .......... H04N 5/23248; H04N 5/23264; H04N 5/23212; G06T 7/0081; G06T 7/0069; G06T 7/2006; G06T 7/408; G06T 2207/20201; G06T 2207/10028; G06T 2207/10016; G06T 2207/20141; G06T 2207/20224; G06T 2207/10148; G06T 2207/10004; G06T 2207/10024; G01C 3/08
See application file for complete search history.

(56) References Cited

U.S. PATENT DOCUMENTS 6,034,372 A  * 3/2000 LeVan ....................... G01J 5/08
                                                    250/338.1
6,091,451 A  * 7/2000 Farr ....................... G02B 5/201
                                                    348/273
(Continued)

FOREIGN PATENT DOCUMENTS

GB          2463480 A    3/2010
JP       2007043687 A    2/2007
(Continued)

*Primary Examiner* — Timothy J Henn
(74) *Attorney, Agent, or Firm* — Canon U.S.A., Inc. IP Division (57) ABSTRACT

To reduce the difference among a plurality of images acquired due to an object shake or hand shake. An image capturing apparatus 10 includes an imaging optical system 11 and an image sensor 14 that acquires an image of light coming from the imaging optical system 11. The imaging optical system 11 has an aperture stop 12 including a first aperture and a second aperture. The image sensor 11 has first pixels and second pixels. The central axis of the first aperture and the central axis of the second aperture are aligned with each other. The first aperture has a first optical filter that codes light passing therethrough with a first code. The first pixels receive first coded light coded with the first code. The second pixels do not receive the first coded light and receive light other than the first coded light.

14 Claims, 4 Drawing Sheets

(51) Int. Cl.
  *G01C 3/08* (2006.01)
  *G06T 7/20* (2006.01)
  *G06T 7/40* (2006.01)

(52) U.S. Cl.
  CPC .. *H04N5/23264* (2013.01); *G06T 2207/10004* (2013.01); *G06T 2207/10016* (2013.01); *G06T 2207/10024* (2013.01); *G06T 2207/10028* (2013.01); *G06T 2207/10148* (2013.01); *G06T 2207/20141* (2013.01); *G06T 2207/20201* (2013.01); *G06T 2207/20224* (2013.01)

(56) References Cited

U.S. PATENT DOCUMENTS

| | | | |
|---|---|---|---|
| 6,344,893 B1 | 2/2002 | Mendlovic | |
| 7,881,603 B2* | 2/2011 | Gere | G02B 5/20 348/342 |
| 2005/0146634 A1* | 7/2005 | Silverstein | H04N 9/045 348/360 |
| 2006/0171041 A1* | 8/2006 | Olmstead | G06K 7/10702 359/738 |
| 2007/0035852 A1* | 2/2007 | Farr | G02B 27/147 359/738 |
| 2007/0183049 A1* | 8/2007 | Cieslinski | G02B 5/005 359/581 |
| 2008/0259354 A1 | 10/2008 | Gharib | |
| 2008/0308712 A1* | 12/2008 | Ono | G02B 5/26 250/208.1 |
| 2010/0066854 A1* | 3/2010 | Mather | G02B 5/005 348/222.1 |
| 2011/0267467 A1 | 11/2011 | Kimura | |
| 2012/0154596 A1* | 6/2012 | Wajs | H04N 5/33 348/164 |
| 2012/0314061 A1 | 12/2012 | Yasugi | |
| 2013/0016220 A1* | 1/2013 | Brown | G01J 3/2823 348/164 |
| 2013/0033579 A1* | 2/2013 | Wajs | G02B 7/365 348/46 |

FOREIGN PATENT DOCUMENTS

| | | |
|---|---|---|
| JP | 2010016743 A | 1/2010 |
| WO | 2011101035 A1 | 8/2011 |

* cited by examiner

IMAGE CAPTURING APPARATUS

TECHNICAL FIELD

The present invention relates to image capturing apparatuses, and in particular, to an image capturing apparatus capable of acquiring a plurality of images at the same time.

BACKGROUND ART

A depth from defocus (DFD) method has been proposed as a method for obtaining object distance information by using an image acquired by an image capturing apparatus, such as a digital camera, a digital video camera, a portable phone camera, a monitoring camera, and a medical camera.

The DFD method acquires a plurality of images with different amounts of blur by controlling image-acquisition parameters of a taking lens and so on. The method obtains the correlation among the amounts of blur of an area including surrounding pixels of each pixel and determines the object distance for each pixel with reference to prepared relationship between the correlation among the amounts of blur and object distances.

Japanese Patent Laid-Open No. 2010-016743 discloses calculating the correlation among the amounts of blur for each processing target area including a ranging target pixel in a plurality of images with different blurs acquired with different image-acquisition parameters to calculate an object distance from the correlation among the amounts of blur.

Japanese Patent Laid-Open No. 2007-043687 discloses a method for switching the apertures and the diameters of a camera at high speed.

CITATION LIST

Patent Literature

PTL 1 Japanese Patent Laid-Open No. 2010-016743
PTL 2 Japanese Patent Laid-Open No. 2007-043687

SUMMARY OF INVENTION

Technical Problem

One of image-acquisition parameters that can be controlled in the DFD method is the diameter of an aperture stop, thus allowing object distance information to be calculated from two images acquired with different aperture diameters.

However, if a plurality of images are acquired with different aperture diameters by the method disclosed in Japanese Patent Laid-Open No. 2010-016743, an image acquired with a first aperture diameter and an image acquired with a second aperture diameter differ in image-acquisition time, thus causing the problem of an object shake and a hand shake.

For example, when the object moves, the position of the object differs between two images, thus causing the problem of an object shake. When an image of the object is acquired with a camera held by hand, the position of the object differs between two images due to the movement of the camera, thus causing the problem of a hand shake.

The DFD method obtains distant information from the correction between the amounts of blur of two images assuming that the object is basically present at the same position. Thus, if an object shake or hand shake occurs, the target object is not present at the same position in the two images, which causes distant information to be acquired from the correlation between the images at different position, thus causing the problem of low range finding accuracy.

The present invention reduces the difference among a plurality of images due to an object shake or hand shake when acquiring the plurality of images.

Solution to Problem

An image capturing apparatus according to an aspect of the present invention includes an imaging optical system and an image sensor that acquires an image of light coming from the imaging optical system. The imaging optical system has an aperture stop including a first aperture and a second aperture. The image sensor has first pixels and second pixels. The central axis of the first aperture and the central axis of the second aperture are aligned with each other. The first aperture has a first optical filter that codes light passing therethrough with a first code. The first pixels receive first coded light coded with the first code. The second pixels do not receive the first coded light and receive light other than the first coded light.

Further features of the present invention will become apparent from the following description of exemplary embodiments with reference to the attached drawings.

Advantageous Effects of Invention

The present invention allows a plurality of images to be acquired at the same time, thus allowing the error among the plurality of images due to an object shake or hand shake to be remarkably reduced.

DESCRIPTION OF EMBODIMENTS

Embodiments of the present invention will be described hereinbelow with reference to the accompanying drawings.

First Embodiment

Figure 1A:
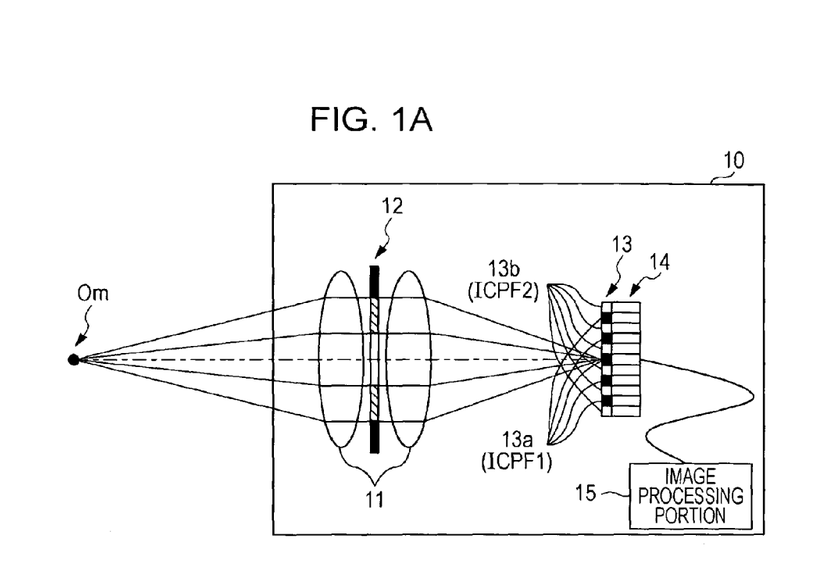
FIGS. 1A and 1B are diagrams showing the configuration of an image capturing apparatus of a first embodiment to which the present invention can be applied.
Figure 1B:
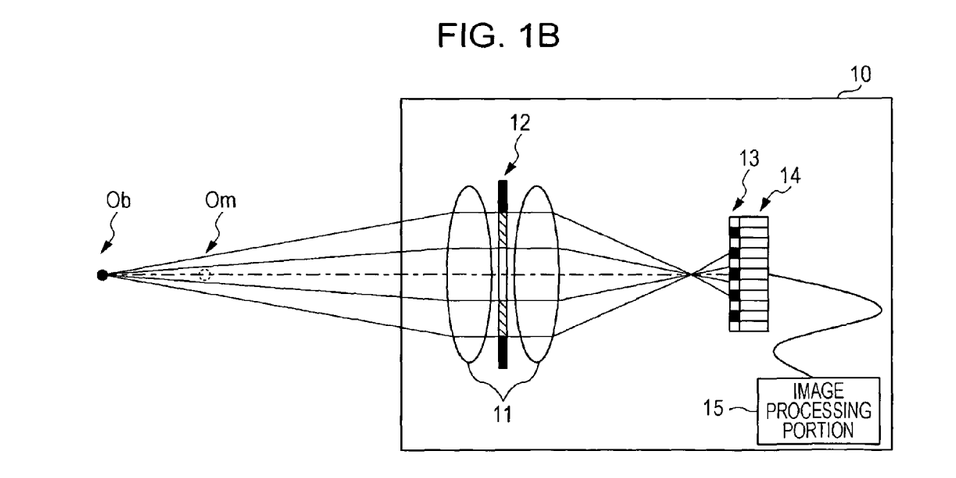

FIGS. 1A and 1B are diagrams showing the configuration of an image capturing apparatus of a first embodiment to which the present invention can be applied.

FIG. 1A shows a state in which a main object Om is acquired by an image capturing apparatus 10 according to the first embodiment of the present invention. As shown in FIG.

1A, the image capturing apparatus 10 of the first embodiment includes an imaging optical system 11, an aperture stop 12, an image-capturing optical filter 13, an image sensor 14, and an image processing portion 15. The imaging optical system 11 focuses on the main object Om to form an image of light coming from the main object Om onto the image sensor 14 via the aperture stop 12 and the image-capturing optical filter 13.

FIG. 1B shows a state in which a background object Ob farther from the image capturing apparatus 10 than the main object Om is acquired, with the main object Om focused on. The imaging optical system 11 does not focus on the background object Ob, in which light coming from the background object Ob forms an image in front of the image sensor 14 via the aperture stop 12 and the image-capturing optical filter 13, resulting in forming a blurred image on the image sensor 14. At that time, the light that has passed through the aperture stop 12 is limited in width, thus having a desired focal depth. The center of the aperture stop 12 is located on the optical axis of the imaging optical system 11.

Figure 2:
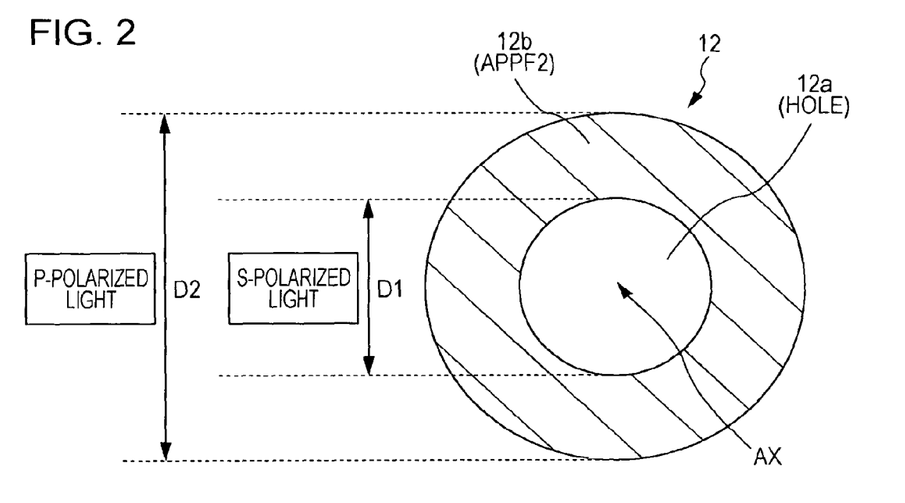
FIG. 2 is a diagram showing the configuration of an aperture stop of the image capturing apparatus of the first embodiment to which the present invention can be applied.

FIG. 2 is a diagram showing the configuration of the aperture stop 12 of the first embodiment. In this embodiment, light passing through the aperture stop 12 is coded using linear polarization. In this specification, the coding is defined as putting codes on light passing through the individual areas (apertures) of the aperture stop. Putting a code allows ascertaining of an area that the light has passed through. Codes can be put by, for example, allowing only light with a predetermined polarization or wavelength to pass through. The aperture stop 12 has a circular aperture (a second aperture) 12a disposed at the center of the aperture stop 12 and a ring-shaped aperture 12b (a first aperture) disposed around the aperture 12a. The aperture 12a and the aperture 12b are disposed coaxially with each other. "Disposed coaxially" means that the central axis of the aperture 12a and the central axis of the aperture 12b are aligned with each other. Furthermore, the apertures 12a and 12b are disposed coaxially with the optical axis of the imaging optical system 11. The aperture 12a is a hole. The aperture 12b has an aperture polarizing filter APPF2 that allows P-polarized light to pass through. Thus, the aperture stop 12 of the image capturing apparatus 10 of the first embodiment has an optical filter for linear polarization only at the aperture 12b to transform light passing through the aperture 12b to first coded light that is coded to P-polarized light. Accordingly, the aperture stop 12 of the image capturing apparatus 10 of the first embodiment allows S-polarized light to pass through only the aperture 12a and allows P-polarized light to pass through both the aperture 12a and the aperture 12b.

Furthermore, as shown in FIG. 1A, the image-capturing optical filter 13 disposed immediately ahead of the image sensor 14 has an alternate image-capturing polarizing filter ICPF1 that allows only S-polarized light to pass through and image-capturing polarizing filter ICPF2 that allows only P-polarized light to pass through. This allows the image sensor 14 to acquire an image whose polarization varies pixel by pixel.

For a color-image capturing apparatus, the image sensor 14 has red, green, and blue color filters. Some red, green, and blue color filters have a Bayer array, in which the number of green filters is typically larger than those of the red and blue filters. Thus, the image-capturing polarizing filter ICPF1 and the image-capturing polarizing filter ICPF2 may be disposed only on pixels for obtaining green. In this case, only a green image is used for distance calculation of the image processing portion 15, to be described later.

As described above, the image sensor 14 of the image capturing apparatus 10 of the first embodiment has pixels (first pixels) that receive only P-polarized light or the first coded light and pixels (second pixels) that receive only S-polarized light other than the first coded light. In other words, the image sensor 14 has pixels that electively obtain light coded by the aperture stop 12.

As shown in FIG. 2, an image acquired only from S-polarized light is an image Ia acquired with a small aperture diameter, a specific f-number of the imaging optical system 14 is 8.0, and the shape of the aperture is circular. In contrast, an image acquired only from P-polarized light is an image Ib acquired with a large aperture diameter, a specific f-number of the imaging optical system 14 is 4.0, and the shape of the aperture is circular.

As described above, the image capturing apparatus 10 of the first embodiment allows a plurality of images using different aperture stops to be acquired at the same time. In particular, two images acquired with different aperture diameters can be acquired at the same time. This can remarkably reduce the positional misalignment of the main object or the background image due to an object shake or hand shake among a plurality of images acquired at the same time.

Acquiring an image with a small aperture diameter increases the depth of field of the imaging optical system 11, thus allowing the amount of blur to be reduced also at a position distant from the focal plane. In contrast, acquiring an image with a large aperture diameter decreases the depth of field of the imaging optical system 11, thus causing only an image in the vicinity of the focal plane to be sharply acquired and increasing the amount of blur with an increasing distance from the focal plane. In other words, the image Ia and the image Ib of the main object Om have high resolution, but the image Ia of the background object Ob has high resolution, and the image Ib of the background object Ob is blurred.

The difference in the amount of blur allows pixel-by-pixel distance information to be calculated using the DFD method. Specifically, small areas at the same position are extracted from an image Is with a small amount of blur and an image Il with a large amount of blur, and the correlation between the extracted small areas. The main cause of a decrease in the correlation between the images (Is and Il) is a difference in the amount of blur. Thus, how the object is separated from the focal position can be estimated from a change (decrease) in the correlation value. The amount of blur due to defocusing changes in such a manner that the resolution or contrast of the high frequency component of the image decreases first. Thus, extracting the high frequency components of the two images Ia and Ib and then calculating the correlation therebetween allows higher accuracy distance estimation. The image processing portion 15 calculates pixel-by-pixel distance information by using the two images Ia and Ib acquired with different aperture diameters using the DFD method. The image processing portion 15 is a computer or a calculation circuit that processes image data on the basis of a signal from the image sensor 14. The image processing portion 15 generates data on the image Ia on the basis of signals from the plurality of pixels (the plurality of second pixels) that receive only S-polarized light and generates data on the image Ib on the basis of signals from the plurality of pixels (the plurality of first pixels) that receive only P-polarized light.

The first embodiment allows the image Ia using a small aperture diameter and the image Ib using a large aperture diameter to be acquired at the same time, thus remarkably reducing the error therebetween due to an object shake or hand shake. Furthermore, the use of the images Ia and Ib greatly improves the distance estimation accuracy of the DFD method. Furthermore, the coaxial structure of the aperture 12a and the aperture 12b causes no misalignment between the objects in the two images Ia and Ib even if defocusing occurs, thus improving the distance estimation accuracy of the DFD method for an object (background object) distant from the focal position. Furthermore, the coaxial disposition of the apertures 12a and 12b and the imaging optical system 11 offers the advantage of causing no misalignment of objects with different depths.

Since the aperture 12a of the first embodiment is a hole, both of S-polarized light and P-polarized light can pass therethrough. Thus, both of S-polarized light that has passed through only the aperture 12a and P-polarized light that has passed through both of the aperture 12a and the aperture 12b are circular in shape. The circular aperture has a large focal depth, thus causing an abrupt change in the correlation between the two images when defocusing occurs. This therefore has an advantage in that the distance of the vicinity of the focal plane to be accurately detected. Furthermore, disposing the polarizing filter APPF2 only in the aperture 12b can reduce a loss in the amount of light passing through the aperture stop 12.

Setting the exposure time of an image formed of S-polarized light, which is an image acquired with a small aperture diameter, longer then the exposure time of an image formed of P-polarized light, which is an image acquired with a large aperture diameter, allows the brightness of the two images to be made uniform. This can further improve the distance estimation accuracy of the DFD method. After the exposure time of P-polarized light ends, a mechanical shutter for exposing the image with only S-polarized light may be used by inserting a new polarizer into the aperture stop 12. Alternatively, the exposure time may be changed between pixels that receive S-polarized light and pixels that receive P-polarized light by using an electronic shutter system.

Alternatively, at least one of the aperture 12a and the aperture 12b may have a transmitting filter for setting the transmittance to reduce the transmission amount of P-polarized light or the first coded light, thereby adjusting the amounts of P-polarized light and S-polarized light to be equal.

The transmittance may satisfy the following expression:

[Math. 1]

$$0.5 \leq \frac{D1^2 \cdot T11 + (D2^2 - D1^2) \cdot T21}{D1^2 \cdot T12 + (D2^2 - D1^2) \cdot T22} \leq 2 \quad (1)$$

where D1 is the diameter of the aperture 12a, D2 is the diameter of the aperture 12b, T11 is the transmittance of P-polarized light or the first coded light in the aperture 12a, T12 is the transmittance of S-polarized light, which is light other than the first coded light, in the aperture 12b, T21 is the transmittance of the first coded light in the aperture 12b, and T22 is the transmittance of light other than the first coded light in the aperture 12b.

In the first embodiment, T11=0.10, T12=0.90, T21=0.10, T22=0.00. The value of Exp. (1) is 1.44, which satisfies the range shown in Exp. (1). This allows the amounts of P-polarized light and S-polarized light to be made substantially equal.

Although the image capturing apparatus 10 of the first embodiment uses an optical filter that codes light by using polarizations, the present invention is not limited thereto; for example, an optical filter that codes light by using waveforms may be used. In particular, for a color-image capturing apparatus, light may be coded by distinguishing waveforms in a spectrum having a color-filter transmissive characteristic (a transmittance of 10% or higher).

Second Embodiment

A second embodiment to which the present invention can be applied will be described. An image capturing apparatus of the second embodiment differs in the aperture stop from the image capturing apparatus 10 of the first embodiment but is the same in the other configuration.

Figure 3:
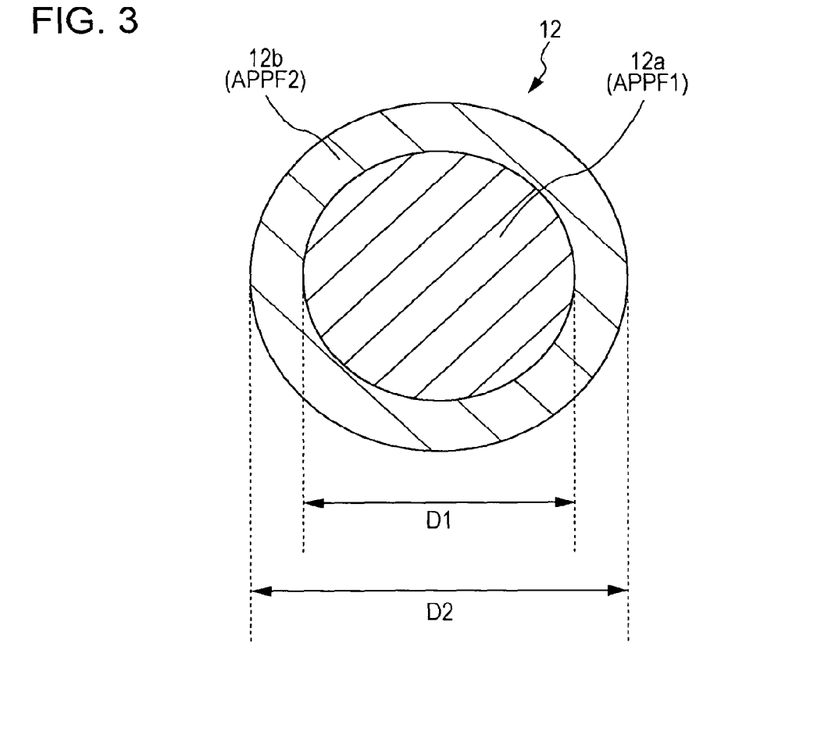
FIG. 3 is a diagram showing the configuration of an aperture stop of a second embodiment to which the present invention can be applied.

FIG. 3 is a diagram showing the configuration of the aperture stop 12 of the second embodiment. Also in the second embodiment, the light passing through the aperture stop 12 is coded using linear polarization. The aperture stop 12 has a circular aperture (a second aperture) 12a disposed at the center of the aperture stop 12 and a ring-shaped aperture (a first aperture) 12b disposed around the aperture 12a. The aperture 12a and the aperture 12b are disposed coaxially with each other. Furthermore, the aperture 12a and the aperture 12b are disposed coaxially with the optical axis of the imaging optical system 11. The aperture 12a has an aperture polarizing filter APPF1 that allows only S-polarized light (component) to pass through. The aperture 12b has an aperture polarizing filter APPF2 that allows only P-polarized light (component) to pass through.

As described above, the aperture stop 12 of the image capturing apparatus 10 of the second embodiment has optical filters for linear polarization in the aperture 12a and the aperture 12b. This transforms light passing through the aperture 12a to second coded light coded by S-polarization, and transforms light passing through the aperture 12b to first coded light coded by P-polarization. In the second embodiment, the aperture diameter and shape of the aperture stop 12 differ between the first coded light and the second coded light. In this specification, the aperture diameter is defined as a value twice as large as the distance between the center of the aperture stop 12 (the optical axis of the imaging optical system 11) and a position of the aperture farthest from the center. For example, the aperture diameter of the aperture 12b of the second embodiment is a value (D2), as shown in FIG. 3.

The S-polarized light passes through only the aperture 12a. An image Ia acquired by receiving only the S-polarized light is an image acquired through the imaging optical system 11 with an f-number of 5.6 and a circular aperture. In contrast, the P-polarized light passes through only the aperture 12b. An image Ib acquired by receiving only the P-polarized light is an image acquired through the imaging optical system 11 with an f-number of 4.0 and an annular aperture.

The annular aperture can make the spot diameter (a width when the point spread function (PSF) is sliced with a value one-half of a peak value) smaller than that of the circular aperture, thus providing an advantage in that the high-frequency component of the object can be imaged with higher fidelity. This allows a change in the amount of blur to be detected more accurately, thus improving the distance estimation accuracy of the DFD method. Since the annular aperture provides a larger focal depth of the spot diameter than the circular aperture, an area in which the distance measurement of the DFD method can be performed can be increased.

For a PSF in the case of a circular aperture and an f-number of 5.6 and a PSF in the case of an annular aperture and an f-number of 4.0, as in the second embodiment, the degrees of the fall of the peaks of the PSFs against the amount of defocusing are substantially equal, but the way of changes in the peripheries of the PSFs differ. For the PSF of a circular aperture and an f-number of 5.6, the periphery rises gradually. In contrast, for the PSF of an annular aperture and an f-number of 4.0, side lobes in the periphery decreases gradually. Detecting the difference between the peripheries allows distance information to be obtained. Thus, the distance information can be calculated using the difference between aperture shapes.

For the aperture stop 12 of the second embodiment, the areas of the aperture 12*a* and the aperture 12*b* are set substantially equal. Specifically, the aperture diameter D2 of the aperture 12*b* is set to √2 times the aperture diameter D1 of the aperture 12*a*, which offers substantially the same advantageous effect as that when the following expression is satisfied:

$$0.8 \times \sqrt{2} \leq D2/D1 \leq 1.2 \times \sqrt{2} \qquad (2)$$

This allows the exposure times of the image Ia of S-polarized light that has passed through only the aperture 12*a* and the image Ib of P-polarized light that has passed through only the aperture 12*b* to be set equal, thus reducing the error between two images Ia and Ib due to an object shake or hand shake.

This can reduce the misalignment of the object due to an object shake or hand shake. The use of the images Ia and Ib can remarkably improve the distance estimation accuracy of the DFD method.

Furthermore, setting the exposure times of two images Ia and Ib equal offers an advantage to the image capturing apparatus 10 in that a common shutter (a mechanical shutter or an electronic shutter) can be used.

Even if Exp. (2) is not satisfied, disposing transmittance control filters in the aperture 12*a* and the aperture 12*b* and satisfying Exp. (1), as in the first embodiment, allow the amounts of the P-polarized light and the S-polarized light to be set substantially equal.

Third Embodiment

Figure 4:
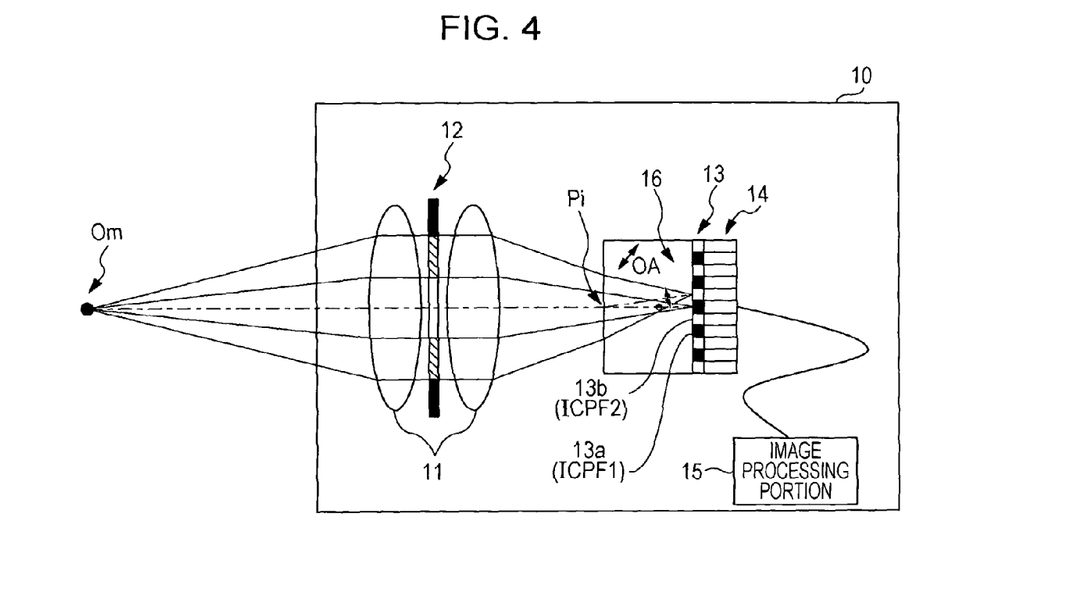
FIG. 4 is a diagram showing the configuration of an image capturing apparatus of a third embodiment to which the present invention can be applied.

FIG. 4 shows a third embodiment to which the present invention can be applied.

An image capturing apparatus 10 of the third embodiment differs from the image capturing apparatus 10 of the first embodiment in that a double-refraction optical element 16 is disposed between the imaging optical system 11 and the image sensor 14.

An example of the double-refraction optical element 16 of the image capturing apparatus 10 of the third embodiment is crystal. If the optic axis OA thereof is disposed at an angle with respect to incident light, S-polarized light, which is polarized in the direction perpendicular to the plane of the drawing, goes straight, and P-polarized light, which is polarized in the direction parallel to the plane of the drawing, travels diagonally, thus splitting into two optical paths. The third embodiment uses this characteristic to introduce light incident on a position Pi on the double-refraction optical element 16 to different pixels of the image sensor 14.

The image-capturing optical filter 13 includes an image-capturing optical filter 13*a* that allows only S-polarized light to pass through and an image-capturing optical filter 13*b* that allows only P-polarized light to pass through. The image capturing apparatus 10 of the third embodiment is configured such that the light split by the double-refraction optical element 16 is incident on the pixels of the optical filter 13*a* or 13*b* of the corresponding polarization direction. This allows the image Ia of S-polarized light and the image Ib of P-polarized light to have completely the same angle of view.

With the DFD method, distance estimation using the amounts of blur is sometimes influenced by the spatial frequency of the texture of the object. Accordingly, if the image Ia of S-polarized light and the image Ib of P-polarized light have different angles of view corresponding to one pixel, the positions of the object in the images Ia and Ib differ a little (corresponding to one pixel), so that the distance is estimated from the different textures, resulting in low distance estimation accuracy.

Since the third embodiment is configured to achieve completely the same angle of view for the image Ia of S-polarized light and the image Ib of P-polarized light by using the double-refraction optical element 16, the positions of the object in the images Ia and Ib can be completely the same. This allows distance estimation using the same texture, thus providing stable distance estimation accuracy.

The image capturing apparatus 10 of the third embodiment is for a monochrome image; for a color-image capturing apparatus in which the color filters have a Bayer array, green pixels are adjacent diagonally to each other. Thus, when splitting light with the double-refraction optical element 16, the angle of the optic axis of the double-refraction optical element 16 and the thickness thereof may be adjusted so as to separate the light diagonally by one pixel.

Although the double-refraction optical element 16 of the third embodiment is crystal, it may be calcite, liquid crystal, or a double-refraction plate with a microstructure.

Fourth Embodiment

An image capturing apparatus 10 of a fourth embodiment differs in the aperture stop and the image-capturing optical filter from the image capturing apparatus 10 of the first embodiment and is the same in the other configuration.

Figure 5:
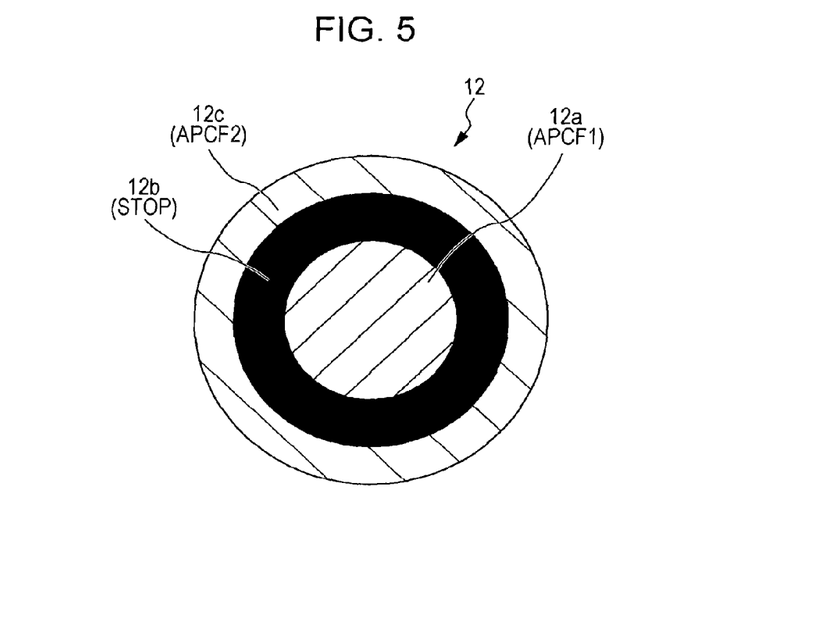
FIG. 5 a diagram showing the configuration of an aperture stop of a fourth embodiment to which the present invention can be applied.

FIG. 5 shows an aperture stop 12 of the fourth embodiment.

The fourth embodiment codes the light passing through the aperture stop 12 using waveforms. The aperture stop 12 has a circular aperture (a second aperture) 12*a* disposed at the center of the aperture stop 12, a ring-shaped aperture 12*b* disposed around the aperture 12*a*, and a ring-shaped aperture (a first aperture) 12*c* disposed around the aperture 12*b*. The aperture 12*a*, the aperture 12*b*, and the aperture 12*c* are disposed coaxially with each other. Furthermore, the aperture 12*a*, the aperture 12*b*, and the aperture 12*c* are disposed coaxially with the optical axis of the imaging optical system 11. The aperture 12*a* has an aperture color filter APCF1 that allows a first spectrum to pass through. The aperture 12*b* has a light shield STOP. The aperture 12*c* has an aperture color filter APCF2 that allows a second spectrum to pass through.

Figure 6:
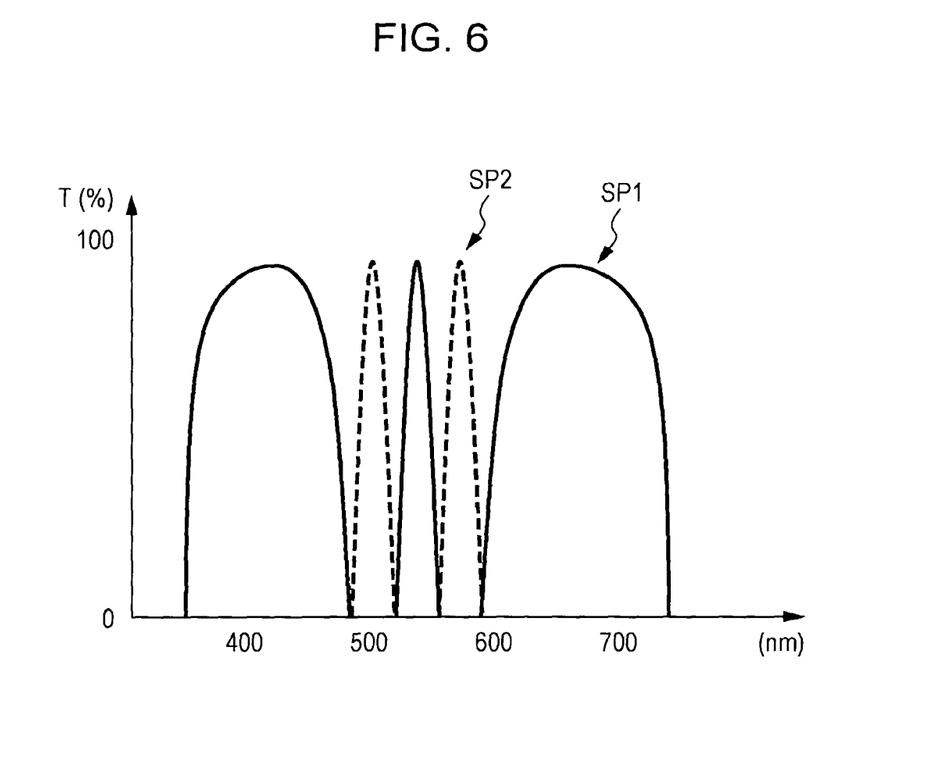
FIG. 6 is a graph showing the spectral transmittance of aperture color filters of an image capturing apparatus of a fourth embodiment to which the present invention can be applied.

FIG. 6 shows the spectral transmittance T of the color filters APCF1 and APCF2 of the fourth embodiment. The solid line in FIG. 6 shows the spectral transmittance T of a first spectrum SP1 of the aperture color filter APCF1, and the broken line shows the spectral transmittance T of a second spectrum SP2 of the aperture color filter APCF2.

As described above, the aperture stop 12 of the image capturing apparatus 10 of the fourth embodiment has the color filters APCF1 and APCF2 in the aperture 12*a* and the aperture 12*c*, respectively. The aperture stop 12 transforms light passing through the aperture 12*a* to second coded light coded by the first spectrum SP1 and transforms light passing through the aperture 12*c* to first coded light coded by the second spectrum SP2.

In the fourth embodiment, the aperture diameter and shape of the aperture stop 12 differ between the first coded light and the second coded light.

The first spectrum SP1 passes through only the aperture 12*a*. An image Ia acquired from only the first spectrum SP1 is an image formed through the imaging optical system 11 with an f-number of 8.0 and a circular aperture. In contrast, the second spectrum SP2 passes through only the aperture 12c. An image Ib acquired from only the second spectrum SP2 is an image formed through the imaging optical system 11 with an f-number of 4.0 and an annular aperture.

The image-capturing optical filter 13 disposed immediately ahead of the image sensor 14 has an alternate image-capturing polarizing filter ICPF1 that allows only the first spectrum SP1 to pass through and image-capturing polarizing filter ICPF2 that allows only the second spectrum SP2 to pass through. This allows the image sensor 14 to acquire an image whose spectrum varies pixel by pixel.

As described above, the image sensor 14 of the fourth embodiment has pixels that receive first coded light coded with a first code and pixels that receive light other than the first coded light.

This allows the image capturing apparatus 10 of the fourth embodiment to acquire images with different aperture diameters and shapes at the same time by using light coded using waveforms.

Disposing transmittance control filters in the aperture 12a and the aperture 12c and satisfying Exp. (1), as in the first embodiment, allow the amounts of the first coded light and light other than the first coded light to be set substantially equal.

Although embodiments of the present invention have been described above, the present invention is not limited thereto, and various modifications and changes can be made within the scope of the sprit thereof.

For example, although the above embodiments use examples in which the aperture diameters or shapes of a plurality of apertures differ, or the aperture shape is circular or annular, the present invention is not limited thereto provided that the plurality of apertures are configured so that the amounts of blur of a plurality of images acquired at the same time differ from each other.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286688, filed Dec. 28, 2012, which is hereby incorporated by reference herein in its entirety.

REFERENCE SIGNS LIST 10 image capturing apparatus
11 imaging optical system
12 aperture stop
13 image-capturing optical filter (optical filter)
14 image sensor
15 image processing portion

The invention claimed is:

1. An image capturing apparatus comprising:
an imaging optical system; and
an image sensor that acquires an image of light coming from the imaging optical system, wherein
the imaging optical system has an aperture stop including a first aperture and a second aperture;
the image sensor has first pixels and second pixels;
the central axis of the first aperture and the central axis of the second aperture are aligned with each other;
the first aperture has a first optical filter that codes light passing therethrough with a first code;
the first pixels receive first coded light coded with the first code; and
the second pixels do not receive the first coded light and receive light other than the first coded light; and
wherein the following expression is satisfied:

$$0.5 \leq \frac{D1^2 \cdot T11 + (D2^2 - D1^2) \cdot T21}{D1^2 \cdot T12 + (D2^2 - D1^2) \cdot T22} \leq 2$$

where D1 is the diameter of the second aperture, D2 is the diameter of the first aperture, T11 is the transmittance of the first coded light in the second aperture, T12 is the transmittance of light other than the first coded light in the second aperture, T21 is the transmittance of the first coded light in the first aperture, and T22 is the transmittance of light other than the first coded light in the first aperture.

2. The image capturing apparatus according to claim 1, wherein
the second aperture has a second optical filter that codes passing light with a second code; and
the second pixels receive second coded light coded with the second code.

3. The image capturing apparatus according to claim 1, wherein
a third optical filter that allows the first coded light to pass through is disposed between the imaging optical system and each of the first pixels; and
a fourth optical filter that does not allow the first coded light to pass through and allows light other than the first coded light to pass through is disposed between the imaging optical system and each of the second pixels.

4. The image capturing apparatus according to claim 2, wherein
a third optical filter that allows only the first coded light of the first and the second coded light to pass through is disposed between the imaging optical system and each of the first pixels; and
a fourth optical filter that allows only the second coded light of the first and the second coded light to pass through is disposed between the imaging optical system and each of the second pixels.

5. The image capturing apparatus according to claim 1, wherein
the optical filter codes light using polarization.

6. The image capturing apparatus according to claim 1, wherein
the optical filter codes light using a waveform.

7. The image capturing apparatus according to claim 1, wherein
the first aperture and the second aperture have an equal area.

8. The image capturing apparatus according to claim 1, wherein the following expression is satisfied:

$$0.8 \times \sqrt{2} \leq D2/D1 \leq 1.2 \times \sqrt{2}$$

where D1 is the diameter of the second aperture, and D2 is the diameter of the first aperture.

9. The image capturing apparatus according to claim 1, wherein at least one of the first and second apertures has a transmitting filter in which at least one of the transmittances of the first coded light and light other than the first coded light is set.

10. The image capturing apparatus according to claim 1, further comprising:
a double-refraction optical element disposed between the imaging optical system and the image sensor, wherein
the double-refraction optical element introduces the first coded light to the first pixels and introduces light other than the first coded light to the second pixels.

11. The image capturing apparatus according to claim 1, further comprising:
an image processing portion that processes image data on the basis of a signal from the image sensor, wherein
the image processing portion generates data on a first image on the basis of signals from the plurality of first pixels and generates data on a second image on the basis of signals from the plurality of second pixels; and
the first and second apertures are configured so that the first image and the second image have different blurs.

12. The image capturing apparatus according to claim 11, wherein the image processing portion obtains object distance information on the basis of the data on the first and second images.

13. The image capturing apparatus according to claim 1, wherein the central axis of the first aperture and the optical axis of the imaging optical system are aligned with each other.

14. The image capturing apparatus according to claim 1, wherein the first and second apertures have different aperture diameters.

* * * * *